United States Patent
Kanamori (10) Patent No.: US 9,678,340 B2
(45) Date of Patent: Jun. 13, 2017

(54) VEHICULAR DISPLAY APPARATUS

(71) Applicant: DENSO CORPORATION, Kariya, Aichi-pref (JP)

(72) Inventor: Naohito Kanamori, Yokkaichi (JP)

(73) Assignee: DENSO CORPORATION, Kariya (JP)

( * ) Notice: Subject to any disclaimer, the term of this patent is extended or adjusted under 35 U.S.C. 154(b) by 36 days.

(21) Appl. No.: 14/435,815

(22) PCT Filed: Jan. 22, 2014

(86) PCT No.: PCT/JP2014/000299
§ 371 (c)(1),
(2) Date: Apr. 15, 2015

(87) PCT Pub. No.: WO2014/115542
PCT Pub. Date: Jul. 31, 2014

(65) Prior Publication Data
US 2015/0268466 A1  Sep. 24, 2015

(30) Foreign Application Priority Data
Jan. 23, 2013 (JP) .................... 2013-010517

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 27/01* (2013.01);
(Continued)

(58) Field of Classification Search
CPC ............ G02B 2027/0165; G02B 27/01; G02B 2027/0198; G02B 2027/0147;
(Continued)

(56) References Cited

U.S. PATENT DOCUMENTS

| 6,100,943 A | 8/2000 | Koide et al. |
| 2004/0008412 A1* | 1/2004 | Jiang .................... G02B 27/283 359/487.02 |

(Continued)

FOREIGN PATENT DOCUMENTS

| DE | 2026117 A1 * | 2/2009 | ............. B60K 35/00 |
| JP | 05-018948 U | 3/1993 | |

(Continued)

OTHER PUBLICATIONS

International Search Report and Written Opinion dated Mar. 4, 2014 in the corresponding International Application No. PCT/JP2014/000299 (with English translation).

*Primary Examiner* — Alexander Eisen
*Assistant Examiner* — Abhishek Sarma
(74) *Attorney, Agent, or Firm* — Posz Law Group, PLC (57) ABSTRACT

A vehicular display apparatus includes a light source unit that emits laser light; a first optical system that uses a first projection surface, onto which a display image is projected, to make a virtual image discernible; a second optical system that uses a second projection surface, onto which the display image is projected, to make a real image discernible; a controller; and a switching mechanism that switch the two optical systems. The distance between the light source unit and first projection surface is smaller than the distance between the light source unit and second projection surface.

10 Claims, 7 Drawing Sheets

(51) Int. Cl.
*H04N 9/31* (2006.01)
*G09G 3/00* (2006.01)

(52) U.S. Cl.
CPC ... *H04N 9/3129* (2013.01); *B60K 2350/2056* (2013.01); *B60K 2350/2065* (2013.01); *G02B 2027/0141* (2013.01); *G02B 2027/0147* (2013.01); *G02B 2027/0165* (2013.01); *G02B 2027/0198* (2013.01); *G09G 3/002* (2013.01); *G09G 2380/10* (2013.01)

(58) Field of Classification Search
CPC ........ G02B 2027/0141; G02B 27/0101; B60K 2350/2056; B60K 2350/2065; B60K 35/00; G09G 2380/10; G09G 3/002; H04N 9/3129
See application file for complete search history.

(56) References Cited

U.S. PATENT DOCUMENTS

| | | | |
|---|---|---|---|
| 2009/0034087 A1* | 2/2009 | Hung | G02B 5/0284 359/630 |
| 2010/0045797 A1* | 2/2010 | Schofield | G06K 9/00818 348/148 |
| 2011/0175798 A1 | 7/2011 | Sato et al. | |

FOREIGN PATENT DOCUMENTS

| | | |
|---|---|---|
| JP | 2001-255488 A | 9/2001 |
| JP | 2010-274803 A | 12/2010 |
| WO | 2012/035623 A1 | 3/2012 |

\* cited by examiner

VEHICULAR DISPLAY APPARATUS

CROSS REFERENCE TO RELATED APPLICATION

The present disclosure is a U.S. national stage application of PCT/JP2014/000299 filed on Jan. 22, 2014 and is based on Japanese Patent Application No. 2013-10517 filed on Jan. 23, 2013, the disclosures of which are incorporated herein by reference.

TECHNICAL FIELD

The present disclosure relates to a vehicular display apparatus, which is installed in a vehicle and provides a display image.

BACKGROUND ART

There is conventionally proposed a vehicular display apparatus that switches (i) virtual image display displaying a virtual image of a display image to be discernible inside a vehicle, and (ii) real image display displaying a real image of the display image to be discernible inside the vehicle. For example, Patent Literature 1 discloses a vehicular display apparatus that switches the virtual image display and real image display through swiveling of a display body itself which presents the display image.

PRIOR ART LITERATURES

Patent Literature

Patent Literature 1: JP H05-18948 U

SUMMARY OF INVENTION

The vehicular display apparatus disclosed in Patent Literature 1 uses a single display body to achieve both virtual image display and real image display. When the size of the display body is set to a size preferable to an optical system for the virtual image display, the real image display thus gets smaller to be hard for an occupant of a vehicle to discern. In contrast, when the size of the display body is set to a size preferable to an optical system for the real image display, the vehicular display apparatus becomes large in size. This may not facilitate preserving of an installation space.

It is an object of the present disclosure to provide a vehicular display apparatus that attains both easiness in discernment of a display image and easiness in preservation of an installation space.

According to an example of the present disclosure, a vehicular display apparatus that is installed in a vehicle and provides a display image is provided as including a light source unit, a first optical system, a second optical system, and a switching section. The light source unit emits laser light. The first optical system projects a display image from the light source unit onto a first projection surface, and displays a virtual image of the display image so that the virtual image is discerned inside the vehicle. The second optical system projects the display image from the light source unit onto a second projection surface, and displays a real image of the display image so that the real image is discerned inside the vehicle. The switching section switches display by the first optical system and display by the second optical system. Further, a distance between the light source unit and the first projection surface is smaller than a distance between the light source unit and the second projection surface.

The above configuration switches the display by the first optical system and the display by the second optical system to enable to display a virtual image or real image of a display image at a position at which an occupant of a vehicle can easily discern the image. Further, the distance between the light source unit and the first projection surface is made smaller than the distance between the light source unit and the second projection surface; this accomplishes the downsizing that facilitates preserving an installation space. Thus, a vehicular display apparatus can be provided which attains both easiness in discernment of a display image and easiness in preservation of the installation space.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

A plurality of embodiments of the present disclosure will be described below. The same reference signs are assigned to corresponding components of the embodiments, whereby an iterative description may be omitted. Assuming that part of the configuration of each of the embodiments is described, to the other part of the configuration, the configuration of any other embodiment described previously can be adapted. In a description of each of the embodiments, not only an explicit combination of components can be adopted but also a combination of parts of the components of the plurality of embodiments which are not explicitly described can be adopted unless the combination has a disadvantage.

First Embodiment

Figure 1:
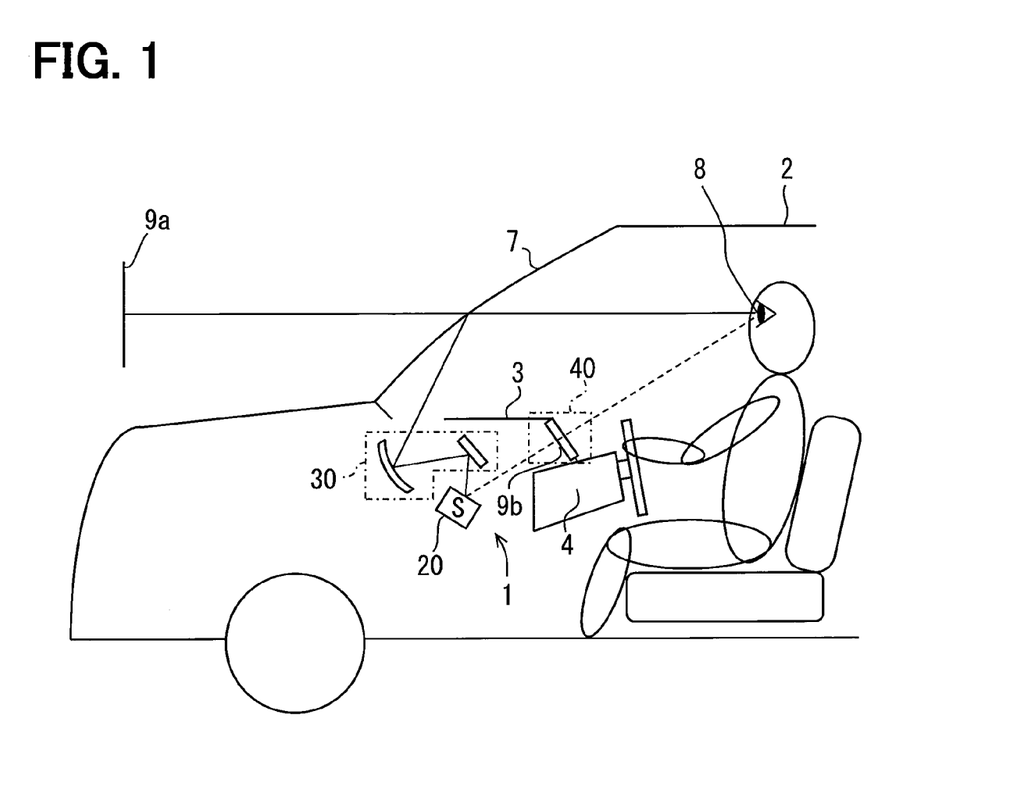
FIG. 1 is a schematic diagram showing an installed state of a vehicular display apparatus according to a first embodiment in a vehicle.

As shown in FIG. 1, a vehicular display apparatus 1 according to a first embodiment of the present disclosure is installed in a vehicle 2 (may be referred to as a host vehicle 2), and stowed in an instrument panel 3. A first optical system 30 of the vehicular display apparatus 1 displays a virtual image 9a of a display image so as to discern the virtual image inside the vehicle 2 through the medium of a windshield 7 of the vehicle 2. More particularly, light reflected from the windshield 7 reaches an eye point 8 of an occupant of the vehicle 2 (hereinafter, referred to as a vehicle occupant). The vehicle occupant perceives the light reaching the eye point 8, and discerns the virtual image 9a of the display image formed in front of the windshield 7.

The windshield 7 of the vehicle 2 is formed like a plate with a translucent glass substrate, and is retained as an integral part of the vehicle 2. The windshield 7A has an interior-side surface on which a display image is projected as a warped concave surface or a flat plane. The windshield 7 may have the interior-side surface and exterior-side surface to have an angular difference for the purpose of suppressing an optical path difference, or may have the interior-side surface to be coated with a vapor deposited film or any other film in order to suppress the optical path difference. Further, in place of the windshield 7, a combiner that is provided as a separate body from the vehicle 2, may be installed in the vehicle 2 so that the display image can be projected onto the combiner.

A second optical system 40 of the vehicular display apparatus 1 displays a real image 9b of a display image so as to discern the real image inside the vehicle 2 through the medium of a screen member 44 that forms a second projection surface 42 while being located on a steering post 4 of the vehicle 2. More particularly, light transmitted by the screen member 44 reaches the eye point 8 of a vehicle occupant. The vehicle occupant perceives the light reaching the eye point 8, and can thus discern the real image 9b of the display image formed on the screen member 44.

(Concrete Configuration)

Figure 3:
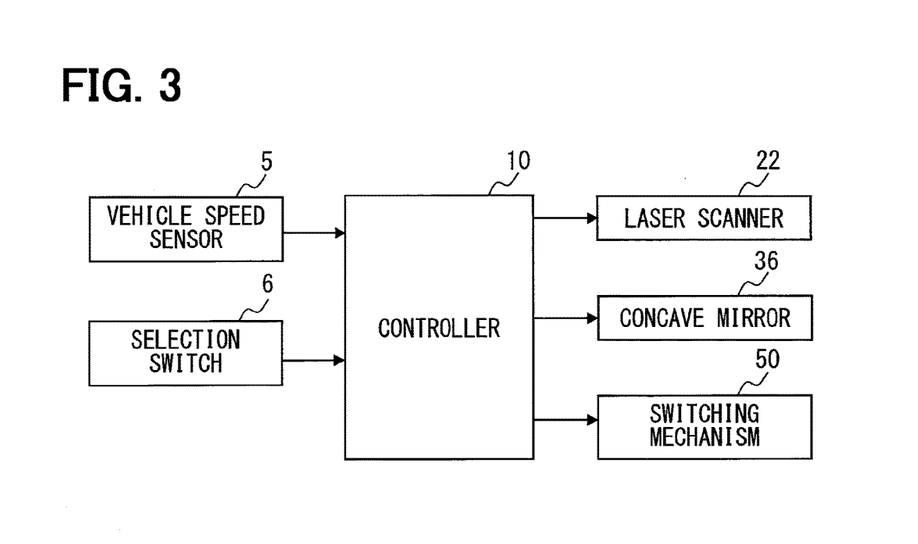
FIG. 3 is a block diagram for explaining a controller in the vehicular display apparatus according to the first embodiment.

The following will explain a specific configuration of the vehicular display apparatus 1 to implement a displaying feature for the virtual image 9a or real image 9b. The vehicular display apparatus 1 includes, as shown in FIG. 3, a controller 10, a light source unit 20, a first optical system 30, a second optical system 40, and a switching mechanism 50.

The controller 10 of the present embodiment is a control circuit including an arithmetic processor and memory. As shown in FIG. 3, the controller 10 is electrically connected to a vehicle speed sensor 5 and selection switch 6 of the vehicle 2. The controller 10 performs switching processing 60, which will be described later, in response to an input signal from the vehicle speed sensor 5 or selection switch 6.

The vehicle speed sensor 5 is a vehicle speed detector that detects the speed of the vehicle 2. The vehicle speed sensor 5 generates a pulsating signal in proportion to the number of revolutions of an axle of, for example, an automobile; and sends to the controller 10 the information signifying that a vehicle movement proportional to the number of pulses of the pulsating signal has arisen. The selection switch 6 is manipulated by a vehicle occupant with hand. The vehicle occupant manipulates the selection switch 6 so as to select either a mode that switches displays automatically according to the vehicle speed, or a mode that switches displays manually according to a manipulation by hand. Upon selecting the latter, the vehicle occupant further manipulates the selection switch 6 by hand, to thereby switch the display by the first optical system 30 and display by the second optical system 40 therebetween. Every time the manipulation is performed, the selection switch 6 sends the information to the controller 10 using a signal.

Figure 4:
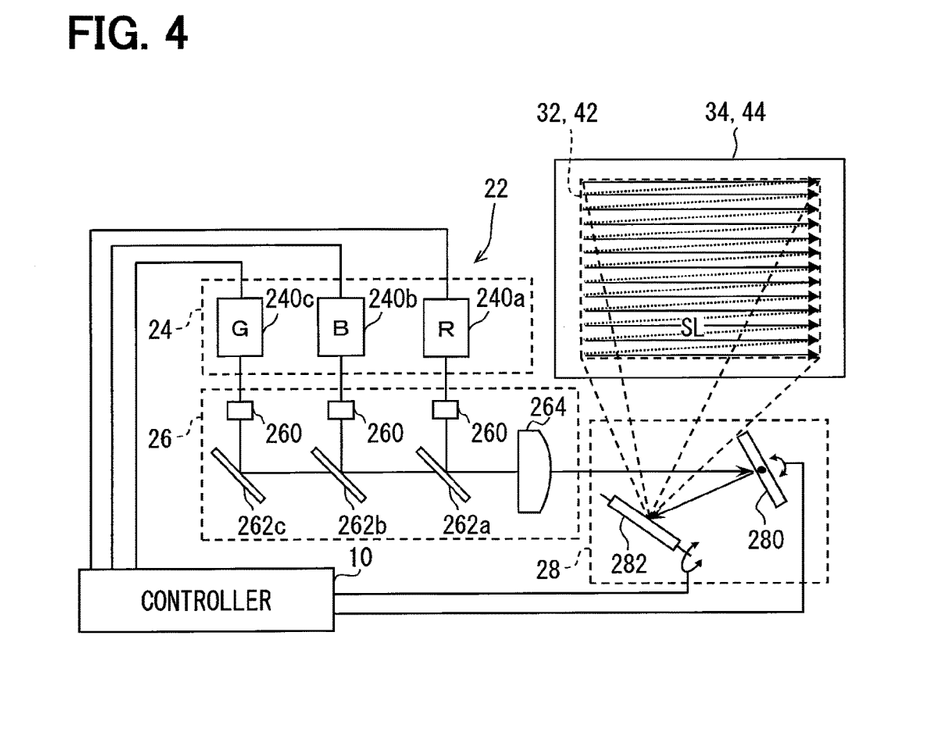
FIG. 4 is a schematic diagram showing the configuration of a light source unit in the vehicular display apparatus according to the first embodiment.

The light source unit 20 of the present embodiment employs a laser scanner 22. The laser scanner 22 includes, as shown in FIG. 4, an oscillation block 24, a light introduction block 26, and a micro-electromechanical system (MEMS) 28.

The oscillation block 24 includes three laser oscillators 240a, 240b, 240c. The laser oscillators 240a, 240b, 240c are electrically connected to the controller 10. The laser oscillators 240a, 240b, 240c oscillate sole-wavelength laser light rays, which are different from one another in hue, in the form of a luminous flux according to a control signal from the controller 10. More particularly, the laser oscillator 240a oscillates red laser light whose peak wavelength ranges, for example, from 600 nm to 650 nm, or preferably, is 635 nm. The laser oscillator 240b oscillates blue laser light whose peak wavelength ranges, for example, from 430 nm to 470 nm, or preferably, is 450 nm. The laser oscillator 240c oscillates green laser light whose peak wavelength ranges, for example, from 490 nm to 530 nm, or preferably, is 510 nm. Adding up and mixing laser light rays of three colors oscillated from the respective laser oscillators 240a, 240b, 240c can produce various colors.

The light introduction block 26 includes three collimator lenses 260, three dichroic filters 262a, 262b, 262c, and a condenser lens 264. Each of the collimator lenses 260 is disposed at a distance of, for example, 0.5 mm in an advancing direction of laser light from each associated laser oscillator 240a, 240b, 240c. Each collimator lense 260 refracts laser light emanating from each associated laser oscillator 240a, 240b, 240c, and thus reshapes the luminous flux of laser light rays.

Each dichroic filter 262a, 262b, 262c is disposed at a distance of, for example, 4 mm in the advancing direction of laser light from the associated collimator lens 260. Each dichroic filter 262a, 262b, 262c reflects laser light of a specific wavelength out of laser light, which is transmitted by the associated collimator lens 260, and transmits laser light of the other wavelengths. More particularly, the dichroic filter 262a disposed in the advancing direction of the laser oscillator 240a reflects red laser light and transmits laser light of the other colors. The dichroic filter 262b disposed in the advancing direction of the laser oscillator 240b reflects blue laser light and transmits laser light of the other colors. The dichroic filter 262c disposed in the advancing direction of the laser oscillator 240c reflects green laser light and transmits laser light of the other colors.

The dichroic filter 262b is disposed at a distance of, for example, 6 mm in the advancing direction of green laser light reflected from the dichroic filter 262c. The dichroic filter 262a is disposed at a distance of, for example, 6 mm in the advancing direction of blue laser light reflected from the dichroic filter 262b. Owing to the layout, the green laser light reflected from the dichroic filter 262c is transmitted by the dichroic filter 262b, and then mixed with the blue laser light reflected from the dichroic filter 262b. The green laser light and blue laser light are transmitted by the dichroic filter 262a, and then mixed with red laser light reflected from the dichroic filter 262a. The laser light rays of three colors can be thus added up and mixed.

The condenser lens 264 is disposed at a distance of, for example, 4 mm in the advancing direction of green laser light and blue laser light, which are transmitted by the dichroic filter 262a, and red laser light reflected therefrom. The condenser lens 264 is a plano-convex lens having a planar incidence surface and convex emission surface. The condenser lens 264 concentrates a luminous flux of incident laser light rays due to a refraction effect exerted with the surface shape. The laser light having passed through the condenser lens 264 is emitted toward the MEMS 28.

The MEMS 28 includes a horizontal scanner 280, vertical scanner 282, and a driver (unshown). The horizontal scanner 280 provides a thin film-like reflection surface, through metal deposition of aluminum, on a surface whose center part is opposed to the condenser lens 264 at a distance of, for example, 5 mm. The horizontal scanner 280 can be turned on an axis of rotation extending in a vertical direction of the vehicle 2. The vertical scanner 282 provides a thin film-like reflection surface, through the metal deposition of aluminum, on a surface whose center part is opposed to the horizontal scanner 280 at a distance of, for example, 1 mm. The vertical scanner 282 can be turned on an axis of rotation extending in the horizontal direction of the vehicle 2. The driver of the MEMS 28 drives and turns the horizontal scanner 280 and vertical scanner 282 independently of each other in response to a driving signal from the electrically connected controller 10.

Laser light emitted from the condenser lens 264 toward the MEMS 28 is reflected sequentially from the reflection surface of the horizontal scanner 280 and the reflection surface of the vertical scanner 282, and projected onto either the screen member 34 of the first optical system 30 or the screen member 44 of the second optical system 40.

The laser scanner 22 intermittently pulsates and oscillates laser light from the respective laser oscillators 240a, 240b, 240c in response to control signals from the electrically connected controller 10. In addition, the driver of the MEMS 28 drives and turns the horizontal scanner 280 and vertical scanner 282 in response to control signals from the controller 10, and thus changes a direction, in which laser light is projected onto the respective projection surfaces 32, 42, sequentially among arrow directions in FIG. 4 along a plurality of scanning lines SL. The foregoing control eventually shifts a region projected in the form of a luminous flux in the respective projection surfaces 32, 42 that are scanned with laser light, rendering a display image. Such a display image is rendered on the respective projection surfaces 32, 42 at 60 frames per sec. as an image having 480 pixels in a horizontal direction x and 240 pixels in a vertical direction y.

Figure 2:
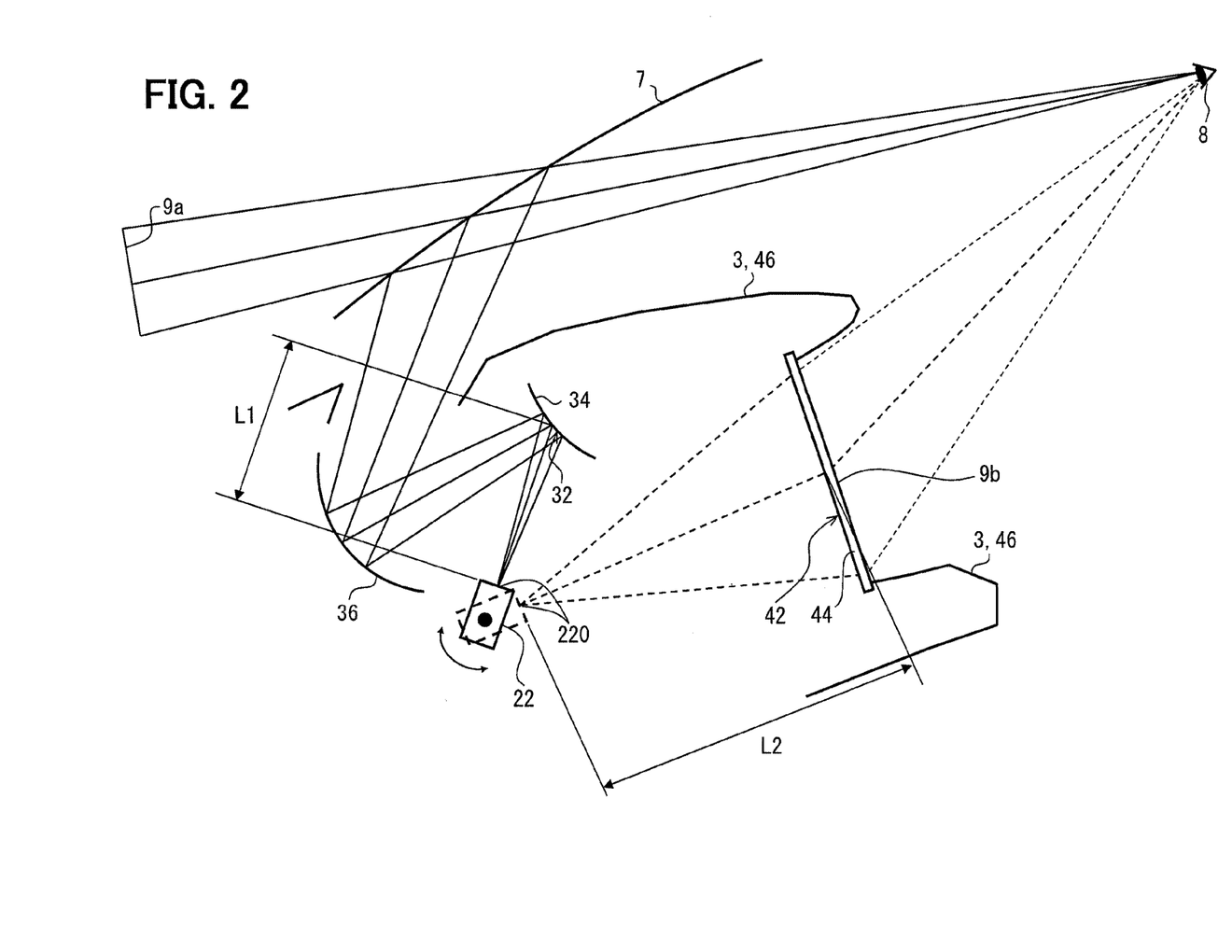
FIG. 2 is a schematic diagram showing the configuration of the vehicular display apparatus according to the first embodiment.

The first optical system 30 of the present embodiment includes, as shown in FIG. 2, the screen member 34 forming the first projection surface 32, and a concave mirror 36.

The screen member 34 is a reflective screen formed by depositing aluminum on the surface of a resin substrate or glass substrate with vapor. The screen member 34 is disposed above the laser scanner 22 in the vehicle 2 (see FIG. 1 and FIG. 2). The first projection surface 32 of the screen member 34 onto which laser light is projected has a warped convex shape, warped concave shape, or flat planar shape, and formed as a thin film-like surface through metal deposition of aluminum. When laser light is projected from the laser scanner 22 onto the first projection surface 32, a display image is rendered. The screen member 34 reflects the laser light, which is projected onto the first projection surface 32, at a predetermined angle.

Figure 5:
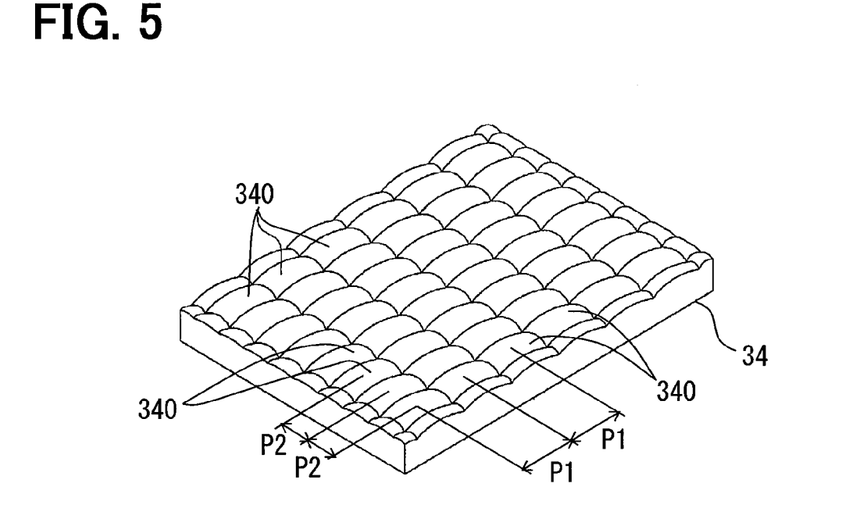
FIG. 5 is a perspective diagram partly showing a screen member of a first optical system in the vehicular display apparatus according to the first embodiment.

As shown in FIG. 5, a plurality of optical elements 340 may be formed as micro-mirrors, which are arranged in the form of a grid, on the screen member 34. The optical elements 340 are formed as an integral part of the screen member 34. Alternatively, the optical elements 340 may be formed separately from the screen member 34 and retained at the body of the screen member 34. The optical elements 340 reflect laser light, which is projected onto the first projection surface 32, at a predetermined angle due to a diffraction effect.

The concave mirror 36 may be referred to as a magnifying glass 36, and formed by depositing aluminum on the surface of a resin substrate or glass substrate. The concave mirror 36 has a reflection surface that reflects laser light reflected from the optical elements 340 toward the windshield 7. The reflection surface in the present embodiment is formed on a smoothly curved surface as a concave surface whose center part is dented in a direction receding from the screen member 34 and windshield 7. Such shape permits the reflection surface to magnify and reflect laser light coming from the first projection surface 32. A driver (unshown) of the concave mirror 36 drives and swings the concave mirror 36 in response to a driving signal from the electrically connected controller 10. The concave mirror 36 thus swings; this permits the position of image formation of the virtual image 9a to move up and down.

The second optical system 40 of the present embodiment includes, as shown in FIG. 2, the screen member 44 forming the second projection surface 42. The screen member 44 is a translucent or milky-white transparent screen formed with a resin substrate or glass substrate. The screen member 44 diffuses incident light when a light diffusion agent is kneaded in the substrate. Instead of having the light diffusion agent kneaded in the substrate, the screen member 44 may contain bubbles. Otherwise, the screen member 44 may not contain bubbles but may have a film coated over the surface, so as to diffuse incident light.

The screen member 44 is surrounded and retained by a screen retainer 46 of the instrument panel 3.

In the first optical system 30, laser light reflected from the concave mirror 36 is projected onto the interior-side surface of the windshield 7; the windshield 7 reflects the laser light, which then reaches the eye point 8 of a vehicle occupant. In contrast, in the second optical system 40, laser light is projected onto the screen member 44; the screen member 44 transmits the projected laser light and diffuses it. The light then reaches the eye point 8 of the vehicle occupant.

In display to be realized by each of the optical systems 30, 40, the energy efficiency of laser light in the first optical system 30 is set to be higher than the energy efficiency of laser light in the second optical system 40. The energy efficiency in the first optical system 30 signifies a ratio of energy of laser light, which is emitted from the first optical system 30 and reaches the eye point 8, to energy of laser light that enters the first optical system 30. The energy efficiency in the second optical system 40 signifies a ratio of energy of laser light, which is emitted from the second optical system 40 and reaches the eye point 8, to energy of laser light that enters the second optical system 40. For example, the energy efficiency of laser light in the first optical system 30 is 30%, while the energy efficiency of laser light in the second optical system 40 is 15%. The settings of the energy efficiencies are determined with, for example, the materials and structures of the screen members 34, 44 and concave mirror 36.

The following will describe the relationship between the screen member 34 forming the first projection surface 32 and the screen member 44 forming the second projection surface 42. The screen members 34, 44 are disposed in different directions with respect to the laser scanner 22 in the light source unit 20. More particularly, the screen members 34, 44 are disposed such that the line segment between the center point of the first projection surface 32 on the screen member 34 and an exit window 220 of the laser scanner 22 intersects with the line segment between the center point of the second projection surface 42 on the screen member 44 and the exit window 220, at a predetermined angle, for example, 60 degrees.

The screen members 34, 44 are disposed such that the distance L1 between the laser scanner 22 and the first projection surface 32 is smaller than the distance L2 between the laser scanner 22 and the second projection surface 42; for example, the difference L2-L1 between the distances L1, L2 is 30 mm. Thus, the screen members 34, 44 are disposed so as to reduce a dead space caused by the screen member 34 interrupting arrangement of the screen member 44 and screen retainer 46.

Further, the first projection surface 32 is disposed within a focus-free range with respect to laser light that emanates from the laser scanner 22 and enters the screen member 34. Likewise, the second projection surface 42 is disposed within a focus-free range with respect to laser light that emanates from the laser scanner 22 and enters the screen member 44.

In general, a luminous flux of laser light rays diffuses due to a diffraction effect along with an increase in a distance on an optical path from a light source. In contrast, in the present embodiment, a luminous flux of laser light rays emitted from the laser scanner 22 is concentrated by the collimator lenses 260 and condenser lens 264 of the laser scanner 22 cancelling a diffusion phenomenon; this produces a beam waist at which a luminous flux diameter takes on a microscopic value. On the optical path, the focus-free range is defined back and forth of the position of the beam waist. The focus-free range in the present embodiment signifies a range on the optical path within which the luminous flux diameter is equal to or smaller than a predetermined value when a luminous flux emitted from a light source is projected onto the projection surface 32, 42. Disposing the respective projection surfaces 32, 42 within the focus-free range enables a vehicle occupant to recognize a display image as being in focus.

The focus-free range can be adjusted by modifying the face shapes of the collimator lenses 260 and condenser lens 264 of the laser scanner 22. Thus, employing a luminous flux of laser light rays that is a coherent Gaussian beam can define a wide focus-free range. For example, the predetermined value of the luminous flux diameter is set to a diameter of 400 μm in consideration of usage or a discernment environment, while the focus-free range is set to a range from 90 mm to 120 mm with the exit window 220 of the laser scanner 22 as an origin. In this case, for example, the distance L1 between the exit window 220 of the laser scanner 22 and the first projection surface 32 is set to 90 mm that allows the first projection surface to lie within the focus-free range, while the distance L2 between the exit window 220 of the laser scanner 22 and the second projection surface 42 is set to 120 mm that allows the second projection surface to lie within the focus-free range.

If the optical elements 340 are formed like a grid on the screen member 34, the screen member 34 is preferably disposed by taking account of the respective pitches P1, P2 of the optical elements 340 as well as being disposed within the focus-free range. That is, the luminous flux diameter on the screen member 34 is provided to be larger than the respective pitches P1, P2 of the optical elements 340.

In the present embodiment, in consideration of the relationship of L2>L1 determined as mentioned above in terms of the focus-free range, the size of the second projection surface 42 located farther away is set to be larger than the size of the first projection surface 32. The sizes of the projection surfaces 32, 42 refer to the areas of the projection surfaces 32, 42 to be scanned with laser light, respectively. Note that, if the optical elements 340 are formed like a grid on the screen member 34, the surface area of the screen member 34 increases due to the irregularities of the optical elements 340. The sizes of the projection surfaces 32, 42 are defined on the assumption that the projection surfaces are devoid of the irregularities. For example, the size of the first projection surface 32 is 56 mm×90 mm (4.2 inches); the size of the second projection surface 42 is 100 mm×270 mm (11.3 inches). Such size settings can suppress an increase in an installation space due to the deflection angles of the horizontal scanner 280 and vertical scanner 283 getting larger, while creating the large second projection surface 42.

As shown in FIG. 2, the switching mechanism 50 of the present embodiment drives and turns the entire laser scanner 22 by a predetermined angle in a predetermined direction in response to a driving signal from the electrically connected controller 10. The entire laser scanner 22 can be turned on an axis of rotation extending in a lateral direction of the vehicle 2, and driven to turn by 60° in a vertical direction. Along with the turn of the entire laser scanner 22, the direction of laser light projected from the laser scanner 22 is changed to the direction of the screen member 34 of the first optical system 30 or the direction of the screen member 44 of the second optical system 40. This switches the display by the first optical system 30 and the display by the second optical system 40. At this time, the controller 10 outputs the driving signal to the driver of the MEMS 28 so as to designate the deflection angles or scan speeds of the horizontal scanner 280 and vertical scanner 282 respectively according to the size of the selected screen member 34 or screen member 44 of the optical system 30 or optical system 40. Thus, the projection surface 32 or projection surface 42 matching the size of the selected screen member 34 or screen member 44 is formed, and an image is displayed.

The controller 10 sends a driving signal to the switching mechanism 50 so as to switch displays. More particularly, switching of displays is realized through switching processing 60 by the controller 10.

Figure 6:
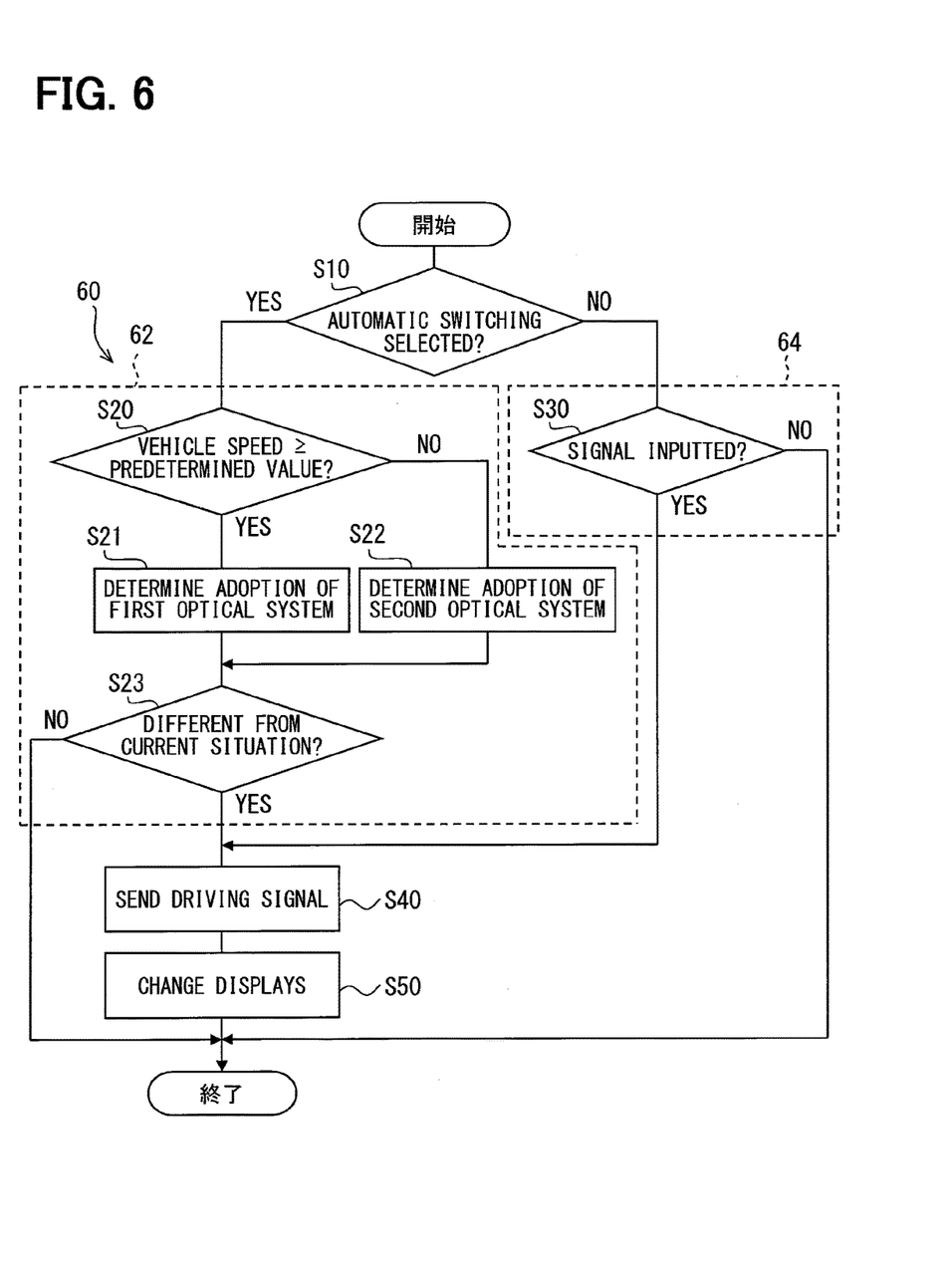
FIG. 6 is a flowchart describing switching processing in the first embodiment.

The following will explain switching processing 60 by the controller 10 using the flowchart of FIG. 6. At S10, it is decided whether a mode switching displays automatically depending on a vehicle speed is selected using the selection switch 6 of the vehicle 2. If an affirmative decision is made at S10, control is passed to automatic switching processing 62 starting with S20. In contrast, if a negative decision is made at S10, control is passed to manual switching processing 64 at S30.

First, automatic switching processing 62 will be described below. At S20, whether a vehicle speed is larger than a predetermined value is decided based on an input signal from the vehicle speed sensor 5 of the vehicle 2. The predetermined value of the vehicle speed is set to, for example, 0 km/h. Whether the vehicle 2 is traveling or at a halt is decided with the predetermined value as a reference. The predetermined value of the vehicle speed may be set to, for example, 10 km/h. In this case, even when low-speed traveling and halt are repeated during a traffic jam, displays will not be frequently switched.

If an affirmative decision is made at S20, adoption of display by the first optical system 30 is determined at S21. In contrast, if a negative decision is made at S20, adoption of display by the second optical system 40 is determined at S22.

If the optical system 30 or optical system 40 that carries out display is determined at S21 or S22, it is decided whether the optical system 30 or optical system 40 that is newly determined to carry out display is different from the optical system 30 or optical system 40 that is currently in charge of display.

If an affirmative decision is made at S23, control is passed to S40. In contrast, if a negative decision is made at S23, the switching processing 60 is terminated.

Next, manual switching processing 64 will be described below. At S30, it is decided whether a signal switching display by the first optical system 30 and display by the second optical system 40 is inputted from the selection switch of the vehicle 2. If an affirmative decision is made at S30, control is passed to S40. In contrast, if a negative decision is made at S30, the switching processing 60 is terminated.

At S40 entered from S23 or S30, the controller 10 sends a driving signal to the switching mechanism 50. The switching mechanism 50 thus switches display by the first optical system 30 and display by the second optical system 40.

Figure 7:
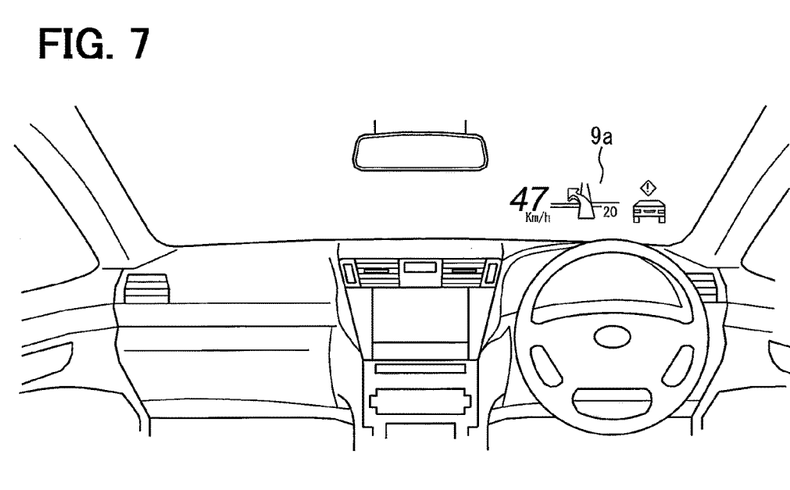
FIG. 7 is a front view showing a display state attained during display by the first optical system in the first embodiment.
Figure 8:
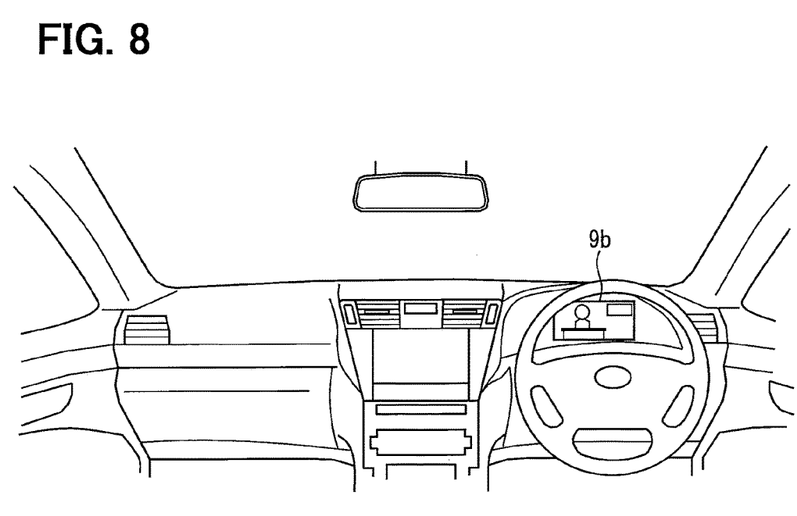
FIG. 8 is a front view showing a display state attained during display by a second optical system in the first embodiment.

Further, at S50 succeeding to S40, contents of display are changed depending on the optical system 30 or optical system 40, whichever carries out display, at the same time when displays are switched. If display resulting from switching is display by the first optical system 30, as in FIG. 7, the virtual image 9a represents displays on information required for traveling, such as vehicle speed display, road information display, traffic sign display, safety information display of a preceding vehicle approach caution or lane deviation alert, or view assist information display. In contrast, if display resulting from switching is display by the second optical system 40, as in FIG. 8, the real image 9b represents displays on information required during a halt, such as vehicle speed display, TV or video picture display, or electronic mail display. At S50, the switching processing 60 is terminated.

(Advantageous Effects)

Advantageous effects of the first embodiment will be described below.

According to the first embodiment, a vehicular display apparatus that is installed in the vehicle 2 and provides a display image includes the light source unit 20, first optical system 30, second optical system 40, and switching section. The light source unit 20 emits laser light. The first optical system 30 projects (in other words, renders) a display image from the light source unit 20 onto the first projection surface 32, and thus displays the virtual image 9a of the display image so as to discern the virtual image inside the vehicle 2. The second optical system 40 projects (in other words, renders) the display image from the light source unit 20 onto the second projection surface 42, and thus displays the real image 9b of the display image so as to discern the real image inside the vehicle 2. The switching section switches display by the first optical system and display by the second optical system. The distance L1 between the light source unit 20 and first projection surface 32 is made smaller than the distance L2 between the light source unit and second projection surface 42. The switching section that switches display by the first optical system 30 and display by the second optical system 40 is implemented by the controller 10 and switching mechanism 50. A combination of the controller 10 and switching mechanism 50 may be referred to not only as the switching section but also as a switching device or switching means.

In order to switch display by the first optical system 30 and display by the second optical system 40, the virtual image 9a or real image 9b of a display image can be displayed at a position at which a vehicle occupant can easily discern the image. Since the distance L1 between the light source unit 20 and first projection surface 32 is made smaller than the distance L2 between the light source unit 20 and second projection surface 42, downsizing making it easy to preserve an installation space can be accomplished. Further, the first projection surface 32 and second projection surface 42 are disposed within a focus-free range with respect to laser light, which emanates from the light source unit 20 and enters the respective optical systems 30, 40 in charge of display. This enables to provide a sharp display image that is easily discernible. The vehicular display apparatus 1 can be thus provided which accomplishes both easiness in discernment of the display image and easiness in preservation of the installation space.

According to the first embodiment, the second projection surface 42 displaying the real image 9b is provided to be large enough to permit the second optical system 40 to display a large display image which is easily discernible.

According to the first embodiment, the display image projected onto the first projection surface 32 in the first optical system 30 displaying the virtual image 9a is magnified by the magnifying glass 36. Even when the size of the first projection surface 32 is reduced in order to preserve an installation space, display by the first optical system 30 can thus provide an easily discernible display image owing to the magnification.

Further, the energy efficiency of laser light in the first optical system 30 is set to be higher than the energy efficiency of laser light in the second optical system 40.

In general, the periphery of display of the virtual image 9a is brighter than the periphery of display of the real image 9b by the second optical system 40 because the position of image formation of the virtual image 9a displayed by the first optical system 30 is a spatial position. If the energy efficiencies in the first and second optical systems are identical to each other, the display of the real image 9b is relatively more brightly discerned than the display of the virtual image 9a is. In contrast, the first embodiment provides the energy efficiency of laser light entering the first optical system 30 to be set to be higher than the energy efficiency of laser light entering the second optical system 40; this permits the brightness of the display of the virtual image 9a to be closer to the brightness of the display of the real image 9b. This can provide the display images to be easily discerned, without causing a vehicle occupant to feel uncomfortable at the time of switching displays.

According to the first embodiment, displays are switched based on the vehicle speed of the vehicle 2. Therefore, necessary information can be displayed at a position, at which the information can be easily discerned, according to the vehicle speed.

According to the first embodiment, display by the first optical system 30 and display by the second optical system 40 are switched by driving and turning the entire laser scanner 22 which serves as an origin of the optical systems 30, 40. This enables to readily design the vehicular display apparatus 1 including the switching mechanism 50.

Second Embodiment

Figure 9:
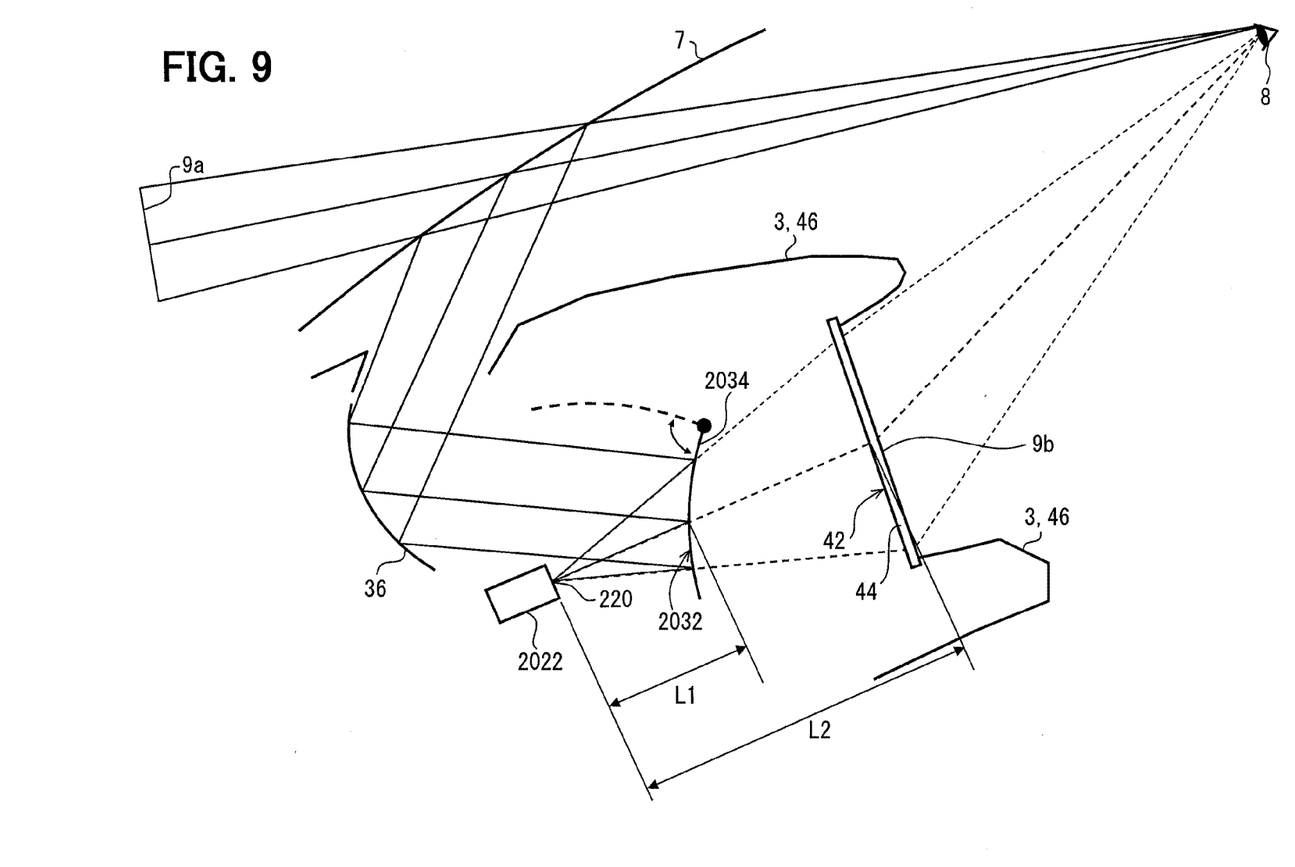
FIG. 9 is a schematic diagram showing the configuration of a vehicular display apparatus according to a second embodiment.

As in FIG. 9, a second embodiment of the present disclosure is a variant of the first embodiment.

(Concrete Configuration)

The concrete configuration of the second embodiment will be described mainly about a point different from the first embodiment.

A switching mechanism 2050 of the present embodiment is provided as shown in FIG. 9. Here, switching display by the first optical system 30 and display by the second optical system 40 is implemented by the controller 10 and switching mechanism 2050. A combination of the controller 10 and switching mechanism 2050 may be referred to as a switching section, switching device, or switching means. The switching mechanism 2050 drives and turns a screen member 2034 in response to a driving signal from the electrically connected controller 10. The screen member 2034 can be turned on, for example, an axis of rotation that extends in the lateral direction of the vehicle 2 and is attached to the upper part of the member 2034. During display by the first optical system 30, the screen member 2034 is disposed, due to a turn, on the optical path of laser light, which is projected from a laser scanner 2022 realizing the light source unit 20; the screen member 2034 thus reflects all laser light rays, which are projected onto the first projection surface 2032, at a predetermined angle, so as to introduce the laser light rays to the concave mirror 36. In contrast, during display by the second optical system 40, the screen member 2034 is stowed, due to a turn, outside the optical path of laser light, which is projected from the laser scanner 2022; this enables projection of the laser light onto the screen member 44. The switching mechanism 2050 thus switches display by the first optical system 30 and display by the second optical system 40. The laser scanner 2022 is held stationary so as not to be movable.

The screen member 2034 forming the first projection surface 2032 and the screen member 44 forming the second projection surface 42 will be described below. As in FIG. 9, during display by the first optical system 30, the screen member 2034 and screen member 44 are disposed in the same direction with respect to the laser scanner 2022 which realizes the light source unit 20. More particularly, during display by the first optical system 30, the screen members 2034, 44 are disposed such that the line segment between the center point of the first projection surface 2032 on the screen member 2034 and an exit window 220 of the laser scanner 2022 intersects with the line segment between the center point of the second projection surface 42 on the screen member 44 and the exit window 220, at zero degree, for example.

During display by the first optical system 30, the screen members 2034 and 44 are disposed so that the distance L1 between the laser scanner 22 and first projection surface 2032 is smaller than the distance L2 between the laser scanner 22 and second projection surface 42, for example, the difference L2-L1 between the distances is 30 mm. This reduces a dead space caused by the screen member 2034 interrupting arrangement of the screen member 44 and screen retainer 46, while sharing part of a space necessary for both the optical paths of the first and second optical systems 30, 40.

Switching processing 60 by the controller 10 is identical to that in the first embodiment. Therefore, the second embodiment having the foregoing components can also exert advantageous effects similar to those of the first embodiment.

In the second embodiment, the screen member 2034 forming the first projection surface 2032 is driven to turn in order to switch display by the first optical system 30 and display by the second optical system 40. The optical paths of the first and second optical systems 30, 40 share part of a space; this accomplishes downsizing making it easier to preserve an installation space.

Other Embodiments

The embodiments of the present disclosure have been described so far. The present disclosure is not interpreted while being limited to the embodiments, but can be applied to various embodiments and combinations without a departure from the gist of the present disclosure.

In a first variant, the size of the second projection surface 42 may be identical to or smaller than the size of the first projection surface 32, 2032.

In a second variant, the first optical system 30 may not include the magnifying glass 36 that magnifies a display image projected from the light source unit 20 onto the first projection surface 32, 2032.

In a third variant, the energy efficiency of laser light in the first optical system 30 may be identical to or smaller than the energy efficiency of laser light in the second optical system 40.

In a fourth variant, the switching processing 60 may be such that display by the first optical system 30 and display by the second optical system 40 are switched in response to a trigger other than the vehicle speed of the vehicle 2, for example, an entry made by a vehicle occupant.

In a fifth variant, as the MEMS 28 of the laser scanner 22 realizing the light source unit 20, an MEMS that includes a biaxial scanner, which has a reflection surface that reflects laser light emanating from the light introduction block, in place of the horizontal scanner 280 and vertical scanner 282, and that drives the biaxial scanner so as to turn the biaxial scanner on an axis of rotation extending in the horizontal direction and an axis of rotation extending in the vertical direction may be adopted.

In a sixth variant, the present disclosure may be adapted to various moving entities (transportation equipment) including ships and airplanes other than the vehicle 2.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicular display apparatus that is installed in a vehicle and provides a display image, comprising:
    a light source unit that emits laser light;
    a first optical system that projects a display image from the light source unit onto a first projection surface, and performs a first display of a virtual image of the display image so that the virtual image is discerned inside the vehicle;
    a second optical system that projects a display image from the light source unit onto a second projection surface, and performs a second display of a real image of the display image so that the real image is discerned inside the vehicle; and
    a switching section that switches the first display by the first optical system and the second display by the second optical system to selectively perform either the first display of the virtual image or the second display of the real image by changing an optical path of the laser light emitted by the light source unit, wherein
a distance between the light source unit and the first projection surface is smaller than a distance between the light source unit and the second projection surface.

2. The vehicular display apparatus according to claim 1, wherein:
during the first display by the first optical system, the first projection surface is disposed within a focus-free range with respect to laser light that emanates from the light source unit and enters the first optical system; and
during the second display by the second optical system, the second projection surface is disposed within a focus-free range with respect to laser light that emanates from the light source unit and enters the second optical system.

3. The vehicular display apparatus according to claim 1, wherein
a size of the second projection surface is larger than a size of the first projection surface.

4. The vehicular display apparatus according to claim 1, wherein
the first optical system includes a magnifying glass that magnifies the display image projected from the light source unit onto the first projection surface.

5. The vehicular display apparatus according to claim 1, wherein
an energy efficiency of laser light in the first optical system is higher than an energy efficiency of laser light in the second optical system.

6. The vehicular display apparatus according to claim 1, wherein
the switching section switches display by the first optical system and display by the second optical system based on a vehicle speed of the vehicle.

7. The vehicular display apparatus according to claim 1, wherein
the switching section drives and turns the light source unit.

8. The vehicular display apparatus according to claim 1, wherein
the switching section drives and turns a member which forms the first projection surface.

9. The vehicular display apparatus according to claim 1, wherein:
the light source unit that emits laser light is configured to be turned to change a direction in which the light source unit emits laser light; and
the switching section controls the light source unit that emits the laser light to be turned by a predetermined angle, to change the optical path of the laser light emitted by the light source unit and thereby switch between the first display of the virtual image and the second display of the real image.

10. The vehicular display apparatus according to claim 1, wherein
the virtual image is discerned inside the vehicle as being formed outside the vehicle; and
said distance between the light source unit and the first projection surface of the virtual image onto which the display image is projected, is smaller than said distance between the light source unit and the second projection surface of the real image.

* * * * *